(12) United States Patent
Chu et al.

(10) Patent No.: US 8,726,659 B2
(45) Date of Patent: May 20, 2014

(54) INTAKE SYSTEM OF ENGINE

(75) Inventors: Dong Ho Chu, Ansan (KR); Sang Kyu Kang, Hwaseong-si (KR); Hyung Jin Kim, Seoul (KR); Guehyun Jung, Seoul (KR); Younsoo Im, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 389 days.

(21) Appl. No.: 13/189,269

(22) Filed: Jul. 22, 2011

(65) Prior Publication Data

US 2012/0117964 A1 May 17, 2012

(30) Foreign Application Priority Data

Nov. 16, 2010 (KR) ........................ 10-2010-0113837

(51) Int. Cl.
*F02B 33/44* (2006.01)
*F02M 35/10* (2006.01)

(52) U.S. Cl.
CPC ... *F02M 35/10157* (2013.01); *F02M 35/10236* (2013.01); *F02M 35/10308* (2013.01); *F02M 35/10144* (2013.01); *F02B 33/44* (2013.01); *F02B 33/446* (2013.01); *Y02T 10/144* (2013.01)
USPC .......................................... 60/611; 60/606.1

(58) Field of Classification Search
CPC .......... F02B 17/16; F02B 37/00; F02B 37/04; F02B 37/16; F02B 37/12; F02B 39/00; F02B 39/16; F02B 33/44; F02B 33/446; F02M 35/10157; F02M 35/10236; F02M 35/10275; F02M 35/10308; F02M 35/10144; F02D 41/007; F02D 23/00; Y02T 10/144

USPC ................................................ 60/611, 605.1
See application file for complete search history.

(56) References Cited

U.S. PATENT DOCUMENTS

| | | | | |
|---|---|---|---|---|
| 4,207,743 A | * | 6/1980 | Ecomard et al. | 60/611 |
| 4,774,812 A | * | 10/1988 | Hitomi et al. | 60/611 |
| 5,277,029 A | | 1/1994 | Kidokoro et al. | |
| 6,722,128 B1 | * | 4/2004 | Adrian | 60/611 |
| 6,810,667 B2 | * | 11/2004 | Jung et al. | 60/611 |
| 7,578,128 B2 | * | 8/2009 | Miyauchi et al. | 60/611 |
| 2012/0073287 A1 | * | 3/2012 | Kang et al. | 60/602 |

FOREIGN PATENT DOCUMENTS

| | | |
|---|---|---|
| JP | 05-098984 A | 4/1993 |
| JP | 2005-069178 A | 3/2005 |
| KR | 10-2007-0040885 A | 4/2007 |

\* cited by examiner

*Primary Examiner* — Thai Ba Trieu
(74) *Attorney, Agent, or Firm* — Morgan, Lewis & Bockius LLP

(57) ABSTRACT

An intake system of an engine may include an intake line supplying an engine with air, an exhaust line that exhaust gas combusted in the cylinder is exhausted, a housing disposed on the intake line and a compressor is disposed therein, the compressor is operated by a turbine disposed on an exhaust line, a recirculation line that recirculates the air from the intake line of a downstream side of the compressor to the intake line of an upstream side of the compressor, and an anti surge valve disposed on the recirculation line to open/close the recirculation line, wherein a length of a first section (l) that is straight from the anti surge valve is longer than two times the outlet diameter (d) of the anti surge valve in the recirculation line that is formed from the anti surge valve to an upstream side of the compressor.

5 Claims, 3 Drawing Sheets

FIG.3

| Section | Analysis result | | Vehicle test result | |
|---|---|---|---|---|
| | Flux | Max speed | Near field noise | Interior noise |
| Prior specification | Base | Base | Base | Base |
| Improved specification | 6%(↑) | 19%(↓) | 5~10(↓) dB(A) | 2~3(↓) dB(A) |

※ Frequency analysis range : 1000 ~ 6000 Hz

INTAKE SYSTEM OF ENGINE

CROSS-REFERENCE TO RELATED APPLICATION

The present application claims priority of Korean Patent Application Number 10-2010-0113837 filed Nov. 16, 2010, the entire contents of which application is incorporated herein for all purposes by this reference.

BACKGROUND OF INVENTION

1. Field of Invention

The present invention relates a turbo-charger having an anti-surge valve circulating reversed air to an upstream side of a compressor when a throttle valve is closed.

2. Description of Related Art

A gasoline engine uses a throttle valve to control intake air, and the intake air can flow backwards at a point of a tip-out (a behavior of taking a driver's foot off the accelerator).

Particularly, in a case that a turbo-charger is mounted therein, the reversed intake air collides with a blade of a compressor to generate noise and vibration and to deteriorate the durability thereof.

A bypass line is formed between an upstream side and a downstream side of the compressor, and an anti-surge valve is disposed on the bypass line so as to resolve the above problem.

The anti-surge valve opens the bypass line to re-circulate the air between the throttle valve and the compressor so as to reduce the noise and vibration generated from the blade of the compressor.

FIG. 1 is a schematic diagram of an intake system of an engine. Referring to the drawing, the intake system of the engine includes a intake line 100, a compressor 110a, an anti surge valve 120, an intercooler pipe 130, an intercooler 140, a throttle valve 145, an intake manifold 150, and an exhaust line 160, and a turbine 110b.

Meanwhile, a turbulent flow is formed in air that re-circulates to the intake line as an inlet of the compressor through the anti surge valve by a tip-out behavior and the air collides with the blade of the compressor that rotates at a high speed to generate high pitched tone noise by pulsation.

Further, during the tip-out behavior, the air does not flow uniformly the anti-surge valve such that flow separation phenomenon is formed and noise is formed by a turbulent flow.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a turbo system having an anti surge valve that is configured to reduce noise generated when air between a compressor and a throttle valve is circulated to an upstream side of the compressor and an intake system of an engine has the turbo system.

One aspect of the present invention is directed to an intake system of an engine that may include an intake line that is configured to supply cylinder of an engine with air, an exhaust line that exhaust gas combusted in the cylinder is exhausted, a housing disposed on the intake line and a compressor is disposed therein, the compressor is operated by a turbine disposed on an exhaust line, a recirculation line that recirculates the air from the intake line of a downstream side of the compressor to the intake line of an upstream side of the compressor, and an anti surge valve disposed on the recirculation line to open/close the recirculation line, wherein a length of a first section (l) that is straight from the anti surge valve is longer than two times the outlet diameter (d) of the anti surge valve in the recirculation line that is formed from the anti surge valve to an upstream side of the compressor.

A distance (L) from the intake line that is connected to the recirculation line to the inlet of the housing is longer than three times the inlet diameter (D) of the housing that the compressor is disposed therein.

The recirculation line may include a first recirculation line that is diverged from the intake line of the downstream side of the compressor to be connected to the anti surge valve, and a second recirculation line that is formed from the anti surge valve to join the intake line of the upstream side of the compressor, wherein an intercooler is disposed at a downstream side of the diverged point that is diverged to the first recirculation line.

A throttle valve may be disposed at a downstream side of the intercooler to adjust the flowing amount of the air.

The first recirculation line may be diverged from an intercooler pipe that is formed between the compressor and the intercooler.

As stated above, while the intake air circulates the anti surge valve during a tip-out or acceleration period, the turbulent flow is decreased and the flow becomes smooth such that the noise is decreased and the emotional quality is improved in the intake system of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a table showing effects of an exemplary intake system of an engine according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
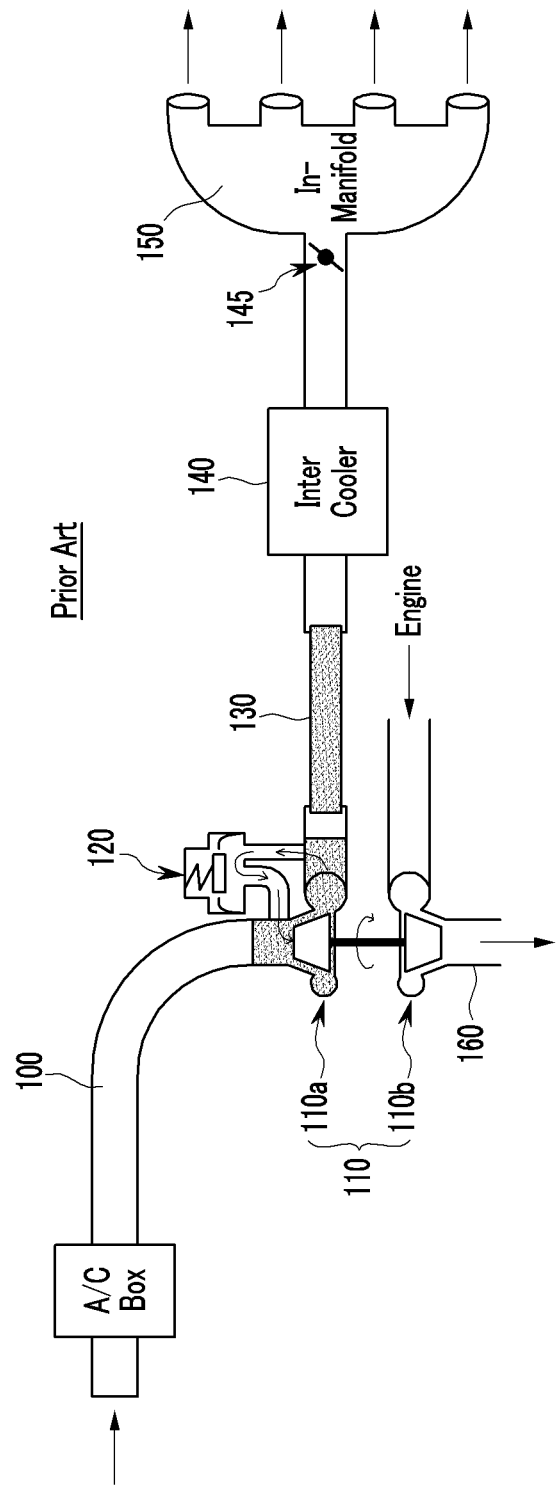
FIG. 1 is a schematic diagram of an intake system of an engine.
Figure 2:
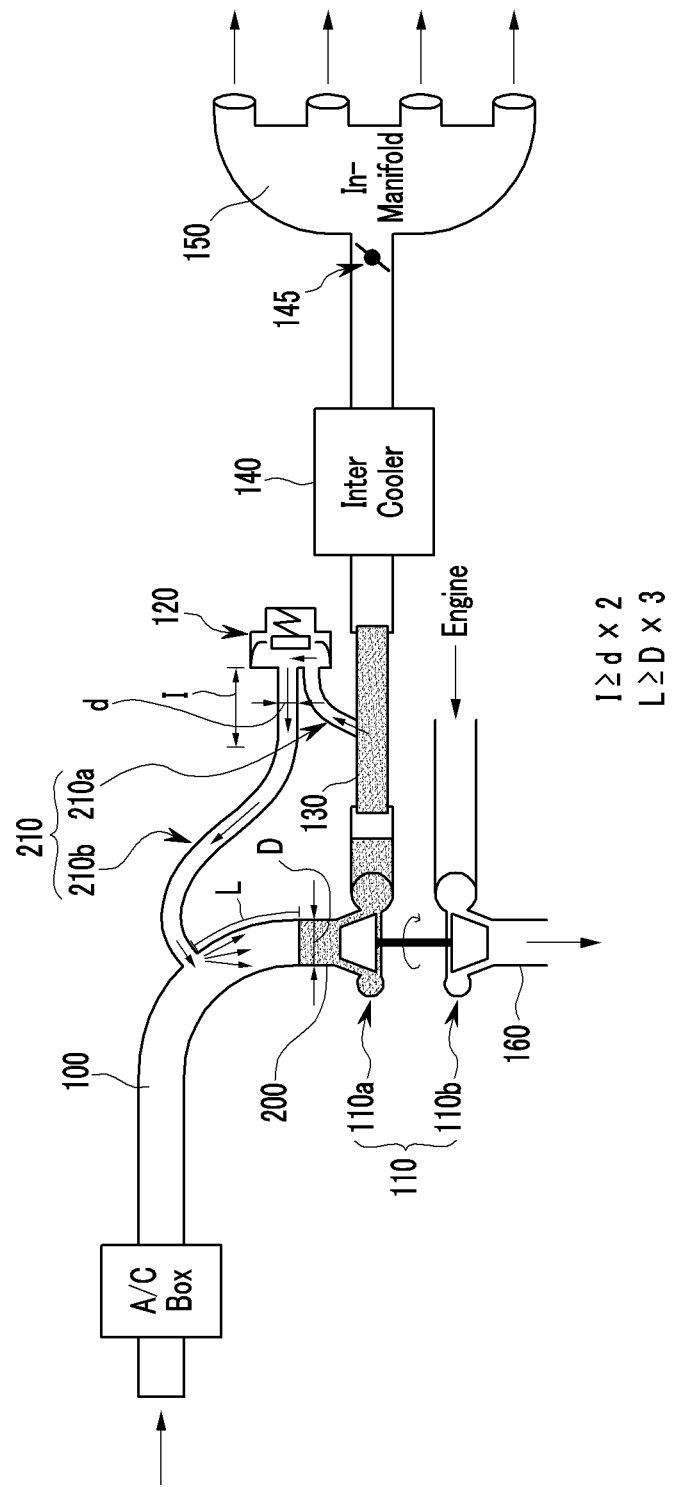
FIG. 2 is a schematic diagram of an exemplary intake system of an engine according to the present invention.

FIG. 2 is a schematic diagram of an intake system of an engine according to various embodiments of the present invention.

Referring to FIG. 2, the intake system of an engine includes an intake line 100 and an exhaust line 160.

A compressor housing 200 that a compressor 110a is built therein, an intercooler pipe 130, an intercooler 140, a throttle valve 145, and an intake manifold 150 are sequentially disposed on the intake line 100, and a turbine 110b is disposed on the exhaust line 160.

Further, the turbocharger 110 includes a turbine 110b and a compressor 110a, wherein the compressor 110a is configured to by rotated by the turbine 110b.

Intake air flow the intake line 100 through the compressor 110a, the intercooler pipe 130, the intercooler 140, the throttle valve 145, and the intake manifold 150 to be supplied into combustion chambers of the engine, and the exhaust gas combusted in the combustion chamber is exhausted through the turbine 110b of the exhaust line 160.

When the throttle valve 145 is closed in the instant of taking driver's foot off the accelerator pedal (Tip out), a recirculation line is formed so as to release a pressure formed between the compressor 110a and the throttle valve 145, and an anti surge valve 120 is mounted on the recirculation line 210.

The anti surge valve 120 opens the recirculation line 210 in a predetermined driving condition to re-circulate the air of the downstream side of the compressor 110a to the upstream side thereof.

The recirculation line 210 includes a first recirculation line 210a and a second recirculation line 210b, the first recirculation line 210a is diverged from the intercooler pipe 130 to be connected to one side of the anti surge valve 120, and one end of the second recirculation line 210b is connected to the anti surge valve 120 and the other end thereof joins the intake line of the upstream side of the compressor 110a.

An inlet of the compressor housing 200 has a diameter D of a predetermined length and a distance L from a point that the intake line 100 joins the second recirculation line 210b, wherein the distance L is 3 times longer than the diameter D.

Accordingly, air flowing into the blade of the compressor 110a becomes uniform such that turbulent flow is decreased and the noise generated thereby is decreased.

In the second recirculation line 210b that is connected to the anti surge valve 120, the length of a first section (I) that is straight from the anti surge valve 120 is 2 times longer than the outlet diameter d of anti surge valve.

Accordingly, the air flow passing the anti surge valve 120 become uniform such that the maximum flow velocity and the noise are decreased.

FIG. 3 is a table showing effects of an intake system of an engine according to various embodiments of the present invention.

Referring to FIG. 3, compared with the conventional art, this invention increases the flow amount by about 6% and decreases the maximum speed by about 19%. Further, there are effects that the near field noise is decreased by 5 to 10 dB and the interior noise is decreased by 2 to 3 dB. The near field noise can be detected by such as a micro phone at a position that is spaced apart by 10 centimeters from the noise source.

As described above, the above invention decreases the noise with a simple structure such that the development time is saved, the noise of the air flowing during acceleration or deceleration is decreased such that the emotional quality is improved, and the noise absorption components are saved such that the production cost is reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An intake system of an engine, comprising:
   an intake line that is configured to supply cylinder of an engine with air;
   an exhaust line that exhaust gas combusted in the cylinder is exhausted;
   a housing disposed in the intake line and a compressor disposed therein, the compressor is operated by a turbine disposed on an exhaust line;
   a recirculation line that recirculates the air from the intake line of a downstream side of the compressor to the intake line of an upstream side of the compressor; and
   an anti surge valve disposed on the recirculation line to open/close the recirculation line,
   wherein a length of a first section (I) that is straight from the anti surge valve is longer than two times the outlet diameter (d) of the anti surge valve in the recirculation line that is formed from the anti surge valve to an upstream side of the compressor.

2. The intake system of claim 1, wherein a distance (L) from the intake line that is connected to the recirculation line to the inlet of the housing is longer than three times the inlet diameter (D) of the housing that the compressor is disposed therein.

3. The intake system of claim 1, wherein the recirculation line includes:
   a first recirculation line that is diverged from the intake line of the downstream side of the compressor to be connected to the anti surge valve; and
   a second recirculation line that is formed from the anti surge valve to join the intake line of the upstream side of the compressor, wherein an intercooler is disposed at a downstream side of the diverged point that is diverged to the first recirculation line.

4. The intake system of claim 3, wherein a throttle valve is disposed at a downstream side of the intercooler to adjust the flowing amount of the air.

5. The intake system of claim 3, wherein the first recirculation line is diverged from an intercooler pipe that is formed between the compressor and the intercooler.

* * * * *